United States Patent [19]

McKinstry

[11] 4,426,956

[45] Jan. 24, 1984

[54] WATER VOLUME INDICATOR FOR AN ANIMAL WATERER

[75] Inventor: James E. McKinstry, Cedar Rapids, Iowa

[73] Assignee: Nelson Manufacturing Company, Cedar Rapids, Iowa

[21] Appl. No.: 400,379

[22] Filed: Jul. 21, 1982

[51] Int. Cl.³ ............................................... A01K 7/00
[52] U.S. Cl. ........................................ 119/72; 119/81; 222/650
[58] Field of Search ............... 119/81, 51 R, 51.11, 119/51.5, 72, 78; 222/639, 642, 650

[56] References Cited

U.S. PATENT DOCUMENTS 3,171,385 3/1965 Decker et al. ................ 119/51.11
3,553,441 1/1971 Launder ........................ 119/51 R
3,650,247 3/1972 McKinstry ........................ 119/81

Primary Examiner—Hugh R. Chamblee
Attorney, Agent, or Firm—Hill, Van Santen, Steadman & Simpson

[57] ABSTRACT

A water volume indicator for an animal waterer which includes a balance beam of substantial mass which supports a water receptacle such that when water is removed the balance beam will pivot to open a valve to allow water to be fed into the bowl and which has a switch which is actuated by movement of the balance beam to close a circuit to actuate a timer such that the time that the valve was opened to add water can be determined. This allows the operator to determine how much water has been removed from the bowl by the horse or other animal and thus the amount of fluid intake by the animal is determined.

8 Claims, 3 Drawing Figures

U.S. Patent   Jan. 24, 1984   4,426,956
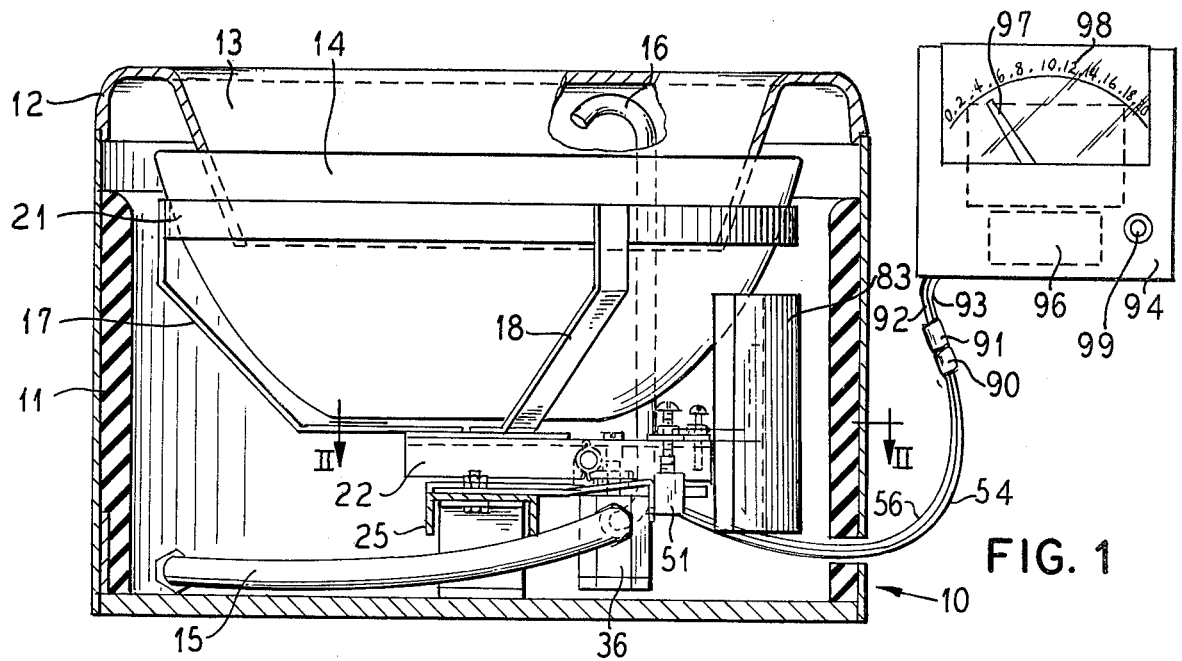
FIG. 1
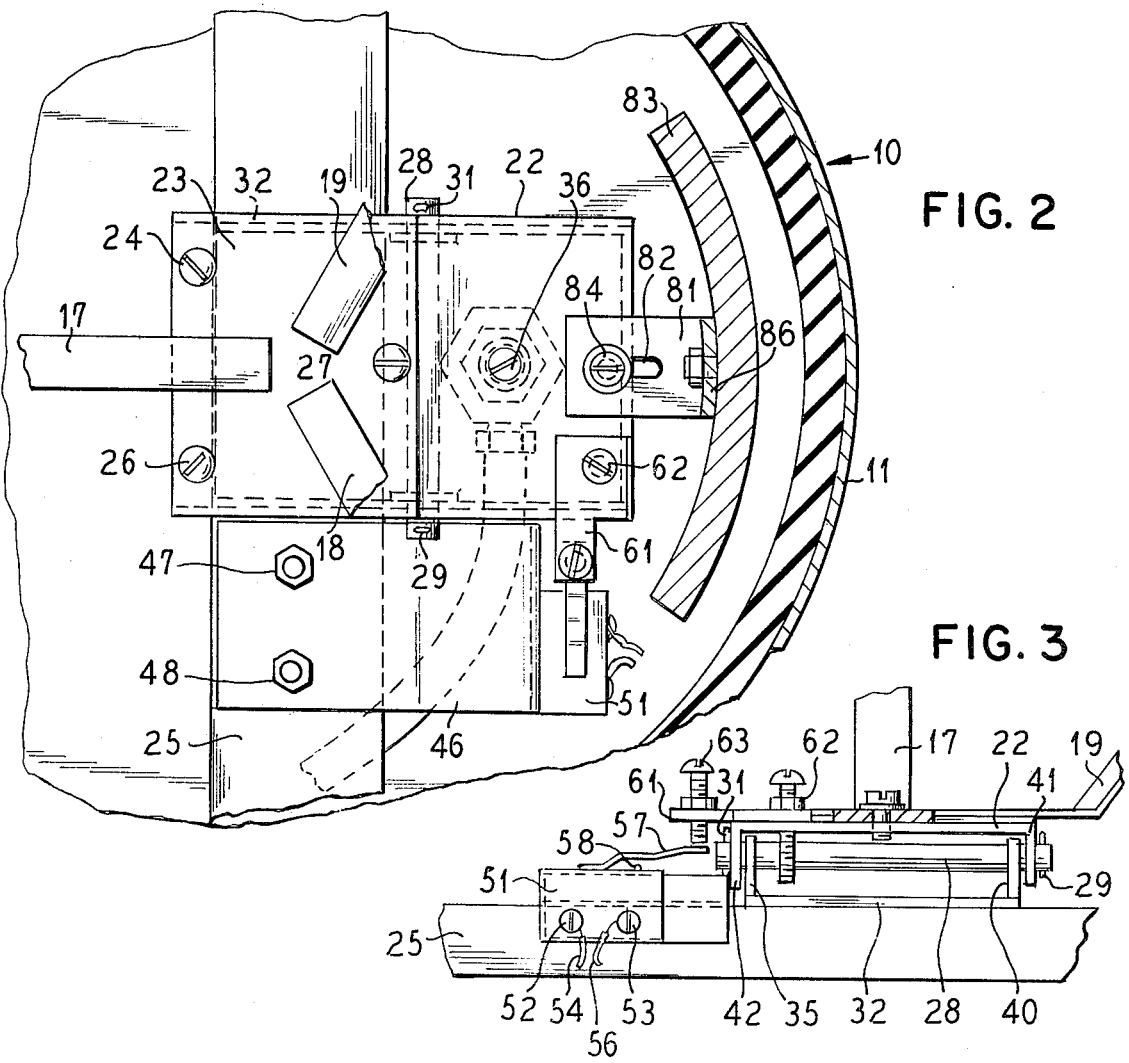
FIG. 2
FIG. 3

WATER VOLUME INDICATOR FOR AN ANIMAL WATERER

BACKGROUND OF THE INVENTION

1. Field of the Invention

This invention relates in general to animal waterers and in particular to a novel animal waterer which measures the amount of water that has been consumed by an animal.

2. Description of the Prior Art

U.S. Pat. No. 3,650,247 which issued on Mar. 21, 1972 entitled "Automatic Waterer" in which the inventor is James E. McKinstry and which is assigned to the assignee of the present invention discloses an automatic waterer which utilizes a self-closing valve and has a balanced beam of substantial mass which controls the water inlet valve and successfully operates as an animal waterer.

Certain animals such as horses and particular race horses, it is necessary to quickly detect when the animal stops drinking. This indicates that there is a danger to the animal's health. Automatic waterers such as disclosed in U.S. Pat. No. 3,650,247 always maintained a filled drinking bowl and do not allow measurement of the amount of water which has been drunk by the animal. Thus, if the animal stops drinking this may not be detected unitl the animal has become very ill such that its health may be endangered.

SUMMARY OF THE INVENTION

The present invention comprises a combination of an animal waterer such as described in U.S. Pat. No. 3,650,247 which disclosure is heereby incorporated by reference and which has an automatic timer that is actuated by the balance beam which actuates the switch to close a circuit to an internval timer such that the operator may monitor the amount of water being drunk by an animal during a particular period by observing the amout of time that the valve has been opened. The timer can be reset and thus the amount of liquid intake can be measured for different intervals as selected by the operator who immediately knows when the animal has stopped drinking which would indicate danger to the animal.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side sectional view of the invention;

FIG. 2 is a cut-away top sectional view of the invention; and

FIG. 3 is a detail view illustrating the time interval switch of the invention.

DESCRIPTION OF THE PREFERRED EMBODIMENTS

FIGS. 1 and 2 illustrate the novel animal waterer 10 of the invention which has generally cylindrical-shaped housing 11 and top cover member 12 with a frusto conical opening 13 through which the animal can drink. A cross-frame member 25 is connected across the housing 11 and a frame member 32 best shown in FIG. 3 is attached to the frame member 25 and has upwardly extending sides 35 and 40. A balanced beam 22 with downwardly extending sides 41 and 42 fits over the sides 35 and 40 of frame member 32 and a pivot pin 28 extends through openings formed in the walls 35, 40, 41 and 42 and carter keys 29 and 31 hold the pivot pin 28 in position. Pivot beam 22 carries a counterweight 83 which connects to the portion 86 of bracket 81 which is formed with a slot 82 through which a bolt 84 extends so as to allow adjustment of the counterwwight 83. A bowl supporing frame comprises the members 17, 18 and 19 which are connected at their top by a ring 21 in which the bowl 14 is received. A water supply inlet pipe 15 connects to a valve 36 and has an outlet 16 which extends along the outside of the bowl 14 and has a curve portion for supplying water into the bowl 14. A bracket 46 is connected by bolts 47 and 48 to the crossframe member 25 and has a switch 51 which might be a micro switch that has a flexible actuating lever 57 as best shown in FIG. 3 which can engage the switch contact 58 to depress it. A bracket 61 is connected to the balance beam 22 by a bolt 62 and has an adjustable screw 3 which is engageable with the flexible spring actuator 57. A pair of screws 52 and 53 comprise switch contacts for the switch 51 and leads 54 and 56 are attachable thereto. The leads 54 and 56 extend to a connector 90 which mates with a connector 91 that has leads 92 and 93 that are connected to an interval timer 94 that has a battery 96, an indicator 97 that can be read against the indicia 98 and a test switch 99.

In operation, the bowl 14 is filled through the valve 36 until the counterbalance 83 is overcome by the weight of the water in the bowl 14 such that the balance beam moves to the position illustrated in FIG. 1 which closes the valve 36 to shut off the water. The interval timer 94 is reset and tested by a button 99 to determine the condition of the battery 96.

The screw 63 is adjusted until its end causes the spring 57 to actuate the switch contact 58 thus closing the switch 51 when the balance beam is in the down position when the valve 36 is opened to supply water to the bowl 14. Thus, as an animal drinks from the bowl, the liquid will reach a level wherein the counterbalance 83 will overcome the weight of the water and the balance beam will pivot clockwise relative to FIG. 1, thus opening valve 36 and simultaneously the screw 63 will engage the spring contact 57 and actuate switch contact 58 closing the circuit through switch 51. This connects the battery 96 to the needle 97 so that it will move clockwise relative to FIG. 1 relative to the indicia 98 to indicate the time that the valve 36 remains open. Since the valve 36 can be calibrated such a for example it might admit 1½ gallon per minute the elapsed time indicator 94 will indicate the amount of water that has been supplied to the bowl 14 in a known interval. Thus, for example, if the valve 36 allows 1½ gallons per minute to enter the bowl and the interval clock 94 indicates that elapsed open time of the valve is 10 minutes it is known that fifteen gallons has been supplied to the bowl 14 during a particular time and the animal such as a horse will have drank this quantity of water.

If the operator observes that the horse for example is not drinking or is drinking small quantities of water, this immediately gives him a warning that the animal is ill and measures must be taken to remedy this situation. Since such condition is detected early, the chances of successful treatment of the animal are greatly enhanced.

Although the invention has been described with respect to preferred embodiments, it is not to be so limited as changes and modifications may be made therein which are within the full intended scope of the invention as defined by the appended claims.

I claim as my invention:

1. An animal waterer comprising, a frame member, a fluid reservoir, a balanced beam pivotally mounted on said frame member and said reservoir mounted on said beam, a fluid supply valve mounted on said frame and connectible to a fluid supply and with an outlet for supplying fluid to said reservoir and having an actuator engageable by said balanced beam when it moves due to insufficient fluid in said reservoir, a switch mounted on said frame and having a switch actuator engageable by said balanced beam to close it when it moves due to insufficient fluid in said reservoir and an indicator connected to said switch and actuated thereby to indicate the time the valve is open to supply fluid.

2. An animal waterer according to claim 1 including an adjustment bolt mounted on said balanced beam and a spring member attached to said switch and engageable with said adjustment screw and said switch actuator to close said switch when said balanced beam moves to close said valve.

3. An animal waterer according to claim 1 wherein said indicator is an interval timer.

4. An animal waterer according to claim 3 including an electrical power supply connected to said switch and indicator to supply power thereto.

5. An animal waterer according to claim 4 wherein said power supply is a battery.

6. An animal waterer according to claim 4 wherein said power supply in an A.C. source.

7. An animal waterer according to claim 4 including a test switch on said indicator.

8. An animal waterer according to claim 4 including a means for resetting said indicator to zero.

* * * * *